United States Patent Office 3,526,655
Patented Sept. 1, 1970

3,526,655
PREPARATION OF ISOCYANATE DERIVATIVES
Perry A. Argabright, Littleton, Colo., assignor to Marathon Oil Company, Findlay, Ohio, a corporation of Ohio
No Drawing. Filed Aug. 11, 1964, Ser. No. 388,925
Int. Cl. C07c 101/26; C08g 22/04
U.S. Cl. 260—471                                18 Claims

ABSTRACT OF THE DISCLOSURE

The present invention comprises a process for the preparation of isocyanate-based compounds comprising reacting an organic halide with an alcohol compound and an alkali cyanate in the presence of a high dielectric aprotic solvent and novel compounds derived therefrom.

This invention relates to the preparation of urethanes, polyurethanes, and prepolymers thereof. More particularly, the invention relates to a one-step process for the preparation of these materials from organic halides and alkali cyanates.

Compounds having "active hydrogen atoms" are known to react with organic isocyanates to form various compounds and polymers. G. H. Saunders et al., Chem. Rev., p. 203–18, (1948). Alkali cyanates and organic halides will also react to form isocyanates. However, the reaction appears to be solvent directed to the formation, primarily, of isocyanurates. Thus, U.S. Pats. 2,536,849 and 2,866,801 teach that isocyanurates only are formed in solvents such as ethylene glycol dibutylether, nitrobenzene, acetonitrile, and dioxane, while small amounts of isocyanate (20–32%) and up to 70% isocyanurate are formed in dimethylformamide.

I have now discovered that high yields of urethanes, polyurethanes and prepolymers thereof, hereinafter termed "isocyanate-based compounds," can be prepared in a one-step process by adding a compound having at least one hydroxy substituent and otherwise substantially inert under reaction conditions to an organic halide in a high dielectric-aprotic solvent containing an alkali cyanate. This result is surprising in view of the fact that organic halides and alkali cyanates give little or no reaction when carried out in hydroxylic solvents such as ethanol. My one-step process is even more surprising when it is found that other compounds, having "active hydrogens"; for example, benzoic acid, urea, and benzamide; and being otherwise reactive with organic isocyanates, do not react with the alkali cyanate in a high dielectric-aprotic solvent such as dimethylformamide.

The following definitions will aid in understanding the invention. The term "aprotic solvent" means a solvent which does not yield a proton to the solute(s) under reaction conditions. The term "polar" means molecular polarity; i.e., the distribution of electric charges in the molecule is nonuniform. For purposes of this invention, "high dielectric" refers to compounds having a dielectric constant higher than the compound monoglyme, otherwise known as 1,2-dimethoxyethane.

Essentially, the process of this invention comprises reacting an alkali cyanate, an organic halide, and an alcohol in the presence of a high dielectric-aprotic solvent. The reaction is carried out at temperatures ranging from about −20–300° C. Temperatures of about 20–200° C. are preferred, and temperatures of 50–150° C. are considered optimum. The reaction temperature depends upon the raw material reactants and solvent. Thus, the high dielectric-aprotic solvents and organic halides are preferably in the liquid or vapor phase at reactant temperatures. Ambient pressures are adequate at reaction temperatures when the volatility of the organic halide, alcohol, and solvent permit. Many reactions can be carried out at atmospheric pressure.

The alkali cyanates, which are employed in my process, include the alkali metal cyanates such as those of lithium, sodium, potassium, and cesium; and the alkaline earth metal cyanates such as those of calcium, magnesium, and strontium. The alkali metal cyanates, particularly sodium and potassium cyanate, are preferred.

Preferred organic halides which are useful and operative as raw materials in my process are halides having only one halogen substituent on each halogen-substituted carbon atom. The substituted carbon atom is preferably saturated for facile reaction; i.e., connected to other atoms by single bonds. Stated another way, the halogen-substituted carbon atoms are not attached to other atoms by double or triple bonds. Of the halogens, chlorine, bromine, and iodine are preferred substituents. Severe reaction conditions are often necessary to cause the formation of organic isocyanate-based compounds from fluorine-substituted compounds.

Examples of specific compounds useful in my process include 3-fluoro-propene; 1-chloro-n-butane; 3-bromo-1-pentene; 1,6-diiodohexane; 1-chlorooctadecane; bromocyclohexane; 3-bromo-1-propene; 2-iodobutane; cyclopropylmethylchloride; 1,7,7-trimethyl-2 - chloro - bicyclo (2,2-1)heptane; 1-iodohexadecane; benzylfluoride; p-methylbenzyl chloride; α-naphthylmethyl bromide; 9-anthrylmethyl chloride; 2-anthrylmethyl bromide; 2-phenylcyclopentylmethyl chloride; α-chloroallylbenzene; p-chlorobenzyl chloride; o-bromobenzyl bromide; 2,3-dibromopropane; 1,3-dibromobutane; 5-bromo-1-pentene; β-chloroethyl methyl ether; β-bromoethyl ether; γ,γ'-dichloropropyl ether; o, m or p-methoxybenzylhalides; β-bromoethylphenyl ether; 1,1 - diethoxy-2-chloroethane; α-bromoethyl acetate; α - bromoacetophenone(phenacyl bromide); α,α'-dichlorodiethylketone; γ-chlorobutyronitrile; p-nitrobenzylbromide; o, m and p-xylylene dichloride; α,α'-dichlorodurene; 1,4-dichlorocyclohexane; α-cyclohexylethyl bromide; 1,4-dichlorobutene-2(cis and trans); allyl chloride; benzhydryl chloride; propargyl chloride; pentachloro-cyclopentadiene; 5 - chlorocyclopentadiene; 1,4-dibromo butyne-2; and 3,4-dichlorobutene-1.

Normally, it is advantageous to use about a 20% equivalent excess of alkali cyanate, though about 0.5:1 to more than 20:1 ratios of equivalents of alkali cyanate to organic halide can be utilized. The alcohol is preferably present in about 20–50 equivalent percent excess though equivalent ratios of 0.5:1 to about 20:1 of active hydrogen compound to alkali cyanate are operable. It is preferred that the alcohol comprise, by weight, no more than about 20% of the reaction solvent system though higher percentages can be utilized at the expense of a fast reaction rate.

The high dielectric-aprotic solvents useful in this invention include the lower alkyl sulfoxides, for example, dimethylsulfoxide and dipropylsulfoxide; the lower dialkyl alkyl amides, such as dimethylformamide, diethylformamide, dimethylacetamide, and diethylpropionamide; the lower dialkyl sulfones, such as dimethylsulfone, methylethylsulfone, and dipropylsulfone; the lower alkyl cyanides, for example, methylcyanide, ethylcyanide, and propylcyanide; the hexa-lower-alkylphosphoramides, such as hexamethylphosphoramide and hexa-isopropylphosphoramide; and the N-lower alkyl pyrrolidones, for example, N-methylpyrrolidone and N-butylpyrrolidone. The tertiary amide type compounds are preferred solvents; for example, dimethylformamide or N-methylpyrrolidone. Of these solvents, dimethylformamide, dimethylacetamide, diethylformamide, diethylacetamide, N-methylpyrrolidone and N-ethylpyrrolidone are the most preferred.

Alcohols useful in my process include, by way of example, methanol, ethanol, allyl alcohol; 3-methyl-2-butanol; 2-ethoxyethanol; cyclopentanol; cresol; resorcinol 1,3-butanediol; 2-nonanol; ethylene glycol; 1,3-propanediol; $\alpha,\alpha'$-dimethylphenol; phenol; benzyl alcohol; 3-phenyl-2-propanol; dimethylethinyl carbinol; 2-methylene-3-oxobutanol; and onleyl alcohol. Preferred alcohols for the preparation of urethanes by my process are methanol, ethanol, propanol, ethylene glycol and 1,6-hexanediol.

Polyhalo compounds and polyhydroxy compounds react to form polymers in the presence of alkali cyanides. The chain length of the forming polymer can be controlled by incorporation of small amounts of a monohalo compound, a monohydroxy compound or mixtures of these compounds. Normally, no more than about 10%, by weight, monofunctional reactant is required to accomplish desirable chain shortening, though more is required if the primary objective of the reaction is to obtain dimetric or trimeric compounds.

The following examples more specifically illustrate my invention. However, it is not intended that the invention be limited to the specific compounds formed, or hydroxy compounds, high dielectric-aprotic solvents, or alkali cyanates used. Rather, it is intended that all equivalents obvious to those skilled in the art be included within the scope of my invention as claimed.

EXAMPLE I

To a slurry of 75 mmol KOCN in an anhydrous mixture of 45 ml. dimethylformamide and 5 ml. ethanol was added 50 mmol of benzylchloride at a temperature of 50 C. After a reaction period of 68 hours, with stirring, the reaction mixture was cooled to room temperature and the inorganic salts removed by filtration. The filtrate was distilled in vacuo (0.05–0.2 mm. Hg) to remove the dimethylformamide and unreacted ethanol. The residue weighed 6.96 g., representing a crude yield of 77.8% of N-benzylethylcarbamate (N-benzylurethane). The solid was recrystallized from an ether-petroleum ether mixture to yield colorless crystals having a melting point of 41.5–42° C. (lit. 44 and 49° C.).

Calcd. $C_{10}H_{13}NO_2$ (percent): C, 67.00; H, 7.26; and N, 7.82. Analysis (percent): C, 66.76; H, 7.19, and N, 7.89.

EXAMPLE II

N-butylchloride was reacted with potassium cyanate utilizing the procedures and reactant ratios of Example I. A 77.6% yield of n-butylurethane was obtained when the reaction was carried out at 115–125° C. for 24 hours. The urethane was distilled directly from the filtrate at high vacuum after the solvent was stripped from the reaction mixture. The boiling point of the product was 202° C. at 624 mm. Hg (lit. 202–203° C. at 765 mm. Hg); $n_D^{25.5}$, 1.4282 (lit. $n_D^{25.5}$, 1.4278).

EXAMPLE III

Utilizing the procedure of Example II, 4 to 6 hours were required to obtain a 55.3% yield of sec-butylurethane. This material had a boiling point of 87–88° C. at 15 mm. Hg (lit B.P. 88–89° C. at 15 mm. Hg); $n_D^{25}$, 1.4276 (lit. $n_D^{25}$, 1.4271).

EXAMPLE IV

Utilizing the procedures and reactant ratios of Example I, n-dodecylchloride was reacted with potassium cyanate at 100° C. over a 45-hour reaction period to yield 76.1% of N(n-dodecyl)urethane having a melting point of 33.6–34.3° C. (lit. 34–35° C.).

EXAMPLE V

Utilizing the procedure and reactant ratios of Example I, $\alpha$-chloromethylnaphthalene was converted to the corresponding urethane at a reaction temperature of 100° C. and reaction time of 21 hours. An 85% yield of crude N-($\alpha$-naphthyl)methyl urethane was obtained. A white crystalline solid having a melting point of 95–96° C. was obtained on sublimation of the crude under high vacuum.

Calcd. $C_{14}H_{15}NO_2$ (percent): C, 73.36; H, 6.55; and N, 6.11. Analysis (percent): C, 73.32; H, 6.58; and N, 6.19.

EXAMPLE VI

Utilizing the procedures of Example I, $\alpha,\alpha'$-dichloro-p-xylene was reacted with KOCN at 100° C. for 19 hours. Utilizing a KOCN:dichloride ratio of 2.5:1 and an ethanol:dichloride ratio 3.44:1. A 70.6% yield of $\alpha,\alpha'$-bis-N-(o-ethylcarbamyl)p-xylene was isolated. The product was triturated with boiling heptane to remove any unreacted starting material. The resulting residue gave a negative $AgNO_3$, whereas benzylchloride and the starting material gave positive tests with this reagent. Thus, it is unlikely that the product contained substantial amounts of the mono-urethane. The fact that the crude product melted at 123–126° C. and was completely soluble in ethanol argued against the presence of the urea or isocyanurate. On sublimation under high vacuum, a crystalline product was obtained having a melting point of 139.5–140.5° C.

Calcd. $C_{14}H_{20}N_2O_4$ (percent): C, 60.00; H, 7.14; and N, 10.00. Analysis (percent): C, 60.03; H, 7.17; and N, 9.88.

EXAMPLE VII

Trans-1,4-dichlorobutene-2 (50 mmols) was reacted with KOCN (125 mmols) and ethanol (172 mmols) in dimethylformamide (75 ml.) The reaction was run at 100° C. for 4.5 hours, then at 50° for an additional 64 hours. A crude yield of about 75% was obtained. On recrystallization from carbontetrachloride and chloroform, a colorless crystalline product having a melting point of 113.5–114.2° C. was obtained. This product was identified via infrared and elemental analysis.

Calcd. $C_{10}H_{18}N_2O_4$ (percent): 52.20; H, 7.82; and N, 12.18. Analysis (percent): C, 52.13; H, 7.78; and N, 12.03 as 1,4-di-N-(o-ethylcarbamyl)butene-2.

The product reacted readily with bromine and carbon tetrachloride to yield an addition product. Hydrogen bromide could not be detected over the carbon tetrachloride solution.

EXAMPLE VIII

Tert-butylchloride was reacted with KOCN and ethanol (the KOCN and ethanol being in a ratio of 1.5:1) with the tert-butylchloride) in dimethylformamide at 100–120° C. for 92 hours. Surprisingly enough, the product was urethane rather than the expected N-tert-butylurethane.

EXAMPLE IX

Following the general procedure of Example VIII, 1,6-dibromohexane is reacted with sodium cyanate and 1,4-di(hydroxymethyl)benzene to form a linear polymer for 24 hours and at 125° C.

EXAMPLE X

A mixture composed of 50 mmols benzylchloride, 60 mmols KOCN, and 61 mmols absolute ethanol in 50 ml. of dry N-methylpyrrolidone was treated at 75° C. with good stirring. After 23.5 hours all of the benzylchloride had been consumed, resulting in an 85% yield of N-benzylurethane.

EXAMPLE XI

In a manner identical to Example X, the following solvents were evaluated:

| Solvent | Time, hours | Percent yield of urethane |
| --- | --- | --- |
| Dimethylsulfoxide | 1.8 | 9.8 |
| Acetonitrile | 114 | 35.8 |
| Absolute ethanol | 40 | Trace (?) |
| 1,2-dimethoxyethane | 73 | 0 |
| Nitrobenzene | 44.5 | 0 |

EXAMPLE XII

A mixture composed of 50 mmols benzylchloride, 75 mmols KOCN, and 75 mmols of phenol in 50 ml. of dimethylformamide was heated at 100° C. for 3.5 hours with good stirring. The reaction mixture was distilled to remove approximately two-thirds of the solvent, poured into water, and filtered. The precipitate (1 g.) was identified as 1,3,5-tribenzylisocyanate. Extraction of the filtrate with ether provided a product which was identified (after recrystallization from $CCl_4$-n-heptane) as N-benzyl O-phenyl carbamate, M.P. 82.5–83.5° C., the desired product.

Calcd. $C_{14}H_{13}NO_2$ (percent): C, 74.01; H, 5.73; and N, 6.17. Analysis (percent): C, 73.81; H, 5.80; and N, 6.41.

EXAMPLE XIII

A mixture of 6.25 g. 1,4-dichlorobutene-2, and 8.94 g. potassium cyanate in 50.0 ml. absolute ethanol was heated at 75° C. for 4 hours with good stirring. The reaction mixture was cooled to room temperature, filtered to remove the inorganics, and the ethanol filtrate analyzed by gas chromatography for diurethanes.

No diurethane was detected by gas chromatography. No precipitate formed on the addition of an aliquot of water to the filtrate. This indicates the absence of the expected solid product.

Now having described my invention, what I claim is:

1. A process for the preparation of isocyanate-based compounds comprising reacting at from about −20 to 300° C. an organic bromide or chloride or iodide with a primary alcohol and an alkali cyanate in the presence of a high dielectric aprotic solvent selected from the group consisting of the lower dialkylamides and N-lower alkyl pyrrolidones, wherein from about 0.5 to about 20 equivalents of alcohol are present per equivalent of alkali cyanate.

2. The process of claim 1 wherein the reaction is carried out at a temperature ranging from about −20° C. to about 300° C., alkali cyanate is present in about 20 equivalent percent excess, and alcohol is present in about 20–50 equivalent percent excess, based on the concentration of organic halide, and the reaction ratio of alcohol to alkali cyanate is from about 0.5:1 to about 20:1.

3. The process of claim 1 wherein the high dielectric-aprotic solvent is selected from the group consisting of dimethylformamide, diethylformamide, and N-methyl-pyrrolidone, and wherein the alcohols used are selected from the group consisting of methanol, ethanol, propanol, ethylene glycol, and 1,6-hexane diol.

4. The process of claim 1 wherein alkali cyanate used is selected from the group consisting of sodium and potassium.

5. The process of claim 1 wherein the solvent comprises dimethylformamide.

6. The process of claim 1 wherein the solvent comprises N-methylpyrrolidone.

7. The process of claim 1 wherein the reaction is carried out at a temperature ranging from about 20° C. to about 200° C.

8. The process of claim 1 wherein, based on the organic bromide and chloride content of the reaction mixture, the alkali cyanate is present in about 20 equivalent percent excess and the alcohol is present in about 20–50% excess per equivalent of organic bromide and chloride.

9. The process of claim 1 wherein the reaction ratio of alkali cyanate to organic bromide and chloride is from 0.5:1 to 20:1 and the reaction ratio of alcohol to alkali cyanate is from about 0.5:1 to 20:1.

10. The process of claim 1 wherein the alcohols used are selected from the group consisting of methanol, ethanol, propanol, ethylene glycol, and 1,6-hexane diol.

11. The process of claim 1 wherein the solvent is selected from the group consisting of N-methylpyrrolidone and dimethylformamide.

12. The process of claim 11 wherein the reaction is carried out at a temperature ranging from about 50° C. to about 150° C.

13. The process of claim 11 wherein, based on the organic halide content of the reaction mixture, the alkali cyanate is present in about a 20 equivalent percent excess and the alcohol is present in about 20–50 equivalent percent excess per equivalent of organic halide.

14. The process of claim 11 wherein the reaction ratio of alkali cyanate to organic halides is from 0.5:1 to 20:1 and the reaction ratio of alcohol to alkali cyanate is from about 0.5:1 to 20:1.

15. The process of claim 11 wherein the alcohol compounds used are methanol, ethanol, propanol, ethylene glycol, and 1,6-hexane diol.

16. The process of claim 11 wherein the alcohol used is selected from the group consisting of methanol, ethanol, propanol, ethylene glycol, and 1,6-hexane diol and wherein the alkali metal cyanate used is selected from the group consisting of sodium cyanate, lithium cyanate, and potassium cyanate.

17. $\alpha,\alpha'$-bis-N-(o-ethylcarbamyl)-p-xylene.

18. 1,4-di-N-(o-ethylcarbamyl)butene-2.

References Cited

UNITED STATES PATENTS 2,697,720   12/1954   Kaiser _____ 260—482
3,297,745   1/1967   Fekete et al. _____ 260—471

OTHER REFERENCES

Griffith, J. R., Chemical Abstracts, vol. 58 (1963) pp. 13844B relied on.

LORRAINE A. WEINBERGER, Primary Examiner

L. A. THAXTON, Assistant Examiner

U.S. Cl. X.R.

260—468, 479, 482, 77.5

UNITED STATES PATENT OFFICE
CERTIFICATE OF CORRECTION

Patent No. 3,526,655              Dated September 1, 1970

Inventor(s) Perry A. Argabright

It is certified that error appears in the above-identified patent and that said Letters Patent are hereby corrected as shown below:

Column 4, lines 36 and 37, "%C" and "%H" should read -- percent C -- and -- percent H --.

Signed and sealed this 29th day of December 1970.

(SEAL)
Attest:

EDWARD M. FLETCHER, JR.           WILLIAM E. SCHUYLER, JR.
Attesting Officer                 Commissioner of Patents

UNITED STATES PATENT OFFICE
CERTIFICATE OF CORRECTION

Patent No. 3,526,655          Dated 9/1/70

Inventor(s) P. A. Argabright

It is certified that error appears in the above-identified patent and that said Letters Patent are hereby corrected as shown below:

Claim 9 should read:

--The process of Claim 1 wherein an organic bromide or chloride is reacted with the primary alcohol and the alkali cyanate and wherein the reaction ratio of alkali cyanate to organic bromide or chloride is from 0.5:1 to 20:1 and the reaction ratio of alcohol to alkali cyanate is from about 0.5:1 to 20:1.--

Signed and sealed this 20th day of April 1971.

(SEAL)
Attest:

EDWARD M. FLETCHER, JR.          WILLIAM E. SCHUYLER, JR.
Attesting Officer                 Commissioner of Patents